United States Patent
Su et al.

(10) Patent No.: US 12,075,005 B2
(45) Date of Patent: Aug. 27, 2024

(54) VOICE SIGNAL RELAY AND TRANSFER METHOD AND RADIO NETWORK GATEWAY

(71) Applicant: Alpha Networks Inc., Hsinchu (TW)

(72) Inventors: Shih Chieh Su, Hsinchu (TW); Ching-Chung Chiang, Hsinchu (TW); Yi Peng Cheng, Hsinchu (TW)

(73) Assignee: ALPHA NETWORKS INC., Hsinchu (TW)

(*) Notice: Subject to any disclaimer, the term of this patent is extended or adjusted under 35 U.S.C. 154(b) by 455 days.

(21) Appl. No.: 17/113,158

(22) Filed: Dec. 7, 2020

(65) Prior Publication Data
US 2022/0159127 A1 May 19, 2022

(30) Foreign Application Priority Data
Nov. 19, 2020 (TW) .................. 109140469

(51) Int. Cl.
*H04M 7/00* (2006.01)
*H04W 76/10* (2018.01)

(52) U.S. Cl.
CPC ........... *H04M 7/006* (2013.01); *H04W 76/10* (2018.02)

(58) Field of Classification Search
CPC .............................. H04M 7/006; H04W 76/10
See application file for complete search history.

(56) References Cited

U.S. PATENT DOCUMENTS

| | | | |
|---|---|---|---|
| 7,589,616 B2* | 9/2009 | Klatsmanyi | G08B 25/10 340/10.1 |
| 2007/0274296 A1* | 11/2007 | Cross | G10L 15/222 370/356 |
| 2007/0274297 A1* | 11/2007 | Cross | G10L 15/30 370/356 |
| 2008/0096597 A1 | 4/2008 | Vempati et al. | |
| 2009/0233596 A1* | 9/2009 | Calabrese | H04W 4/18 455/426.1 |
| 2010/0075708 A1* | 3/2010 | Hong | H04W 4/16 455/518 |
| 2010/0215191 A1* | 8/2010 | Yoshizawa | G10L 21/0208 381/94.2 |

(Continued)

FOREIGN PATENT DOCUMENTS

| | | |
|---|---|---|
| CN | 105338429 | 2/2016 |
| CN | 110460916 | 11/2019 |
| CN | 111478736 | 7/2020 |

OTHER PUBLICATIONS

Douglas Downing et al., Barron's Dictionary of Computer & Internet Terms 458 (10th ed. 2009).*
TW OA issued on Dec. 3, 2021.

*Primary Examiner* — Khaled M Kassim
(74) *Attorney, Agent, or Firm* — WPAT, P.C

(57) ABSTRACT

In a voice signal relay and transfer method for a voice call between a radio voice terminal and a remote device includes, a radio voice signal is received from the radio voice terminal and converting the radio voice signal into a digital voice signal. The digital voice signal is further converted into a group of voice packets in a streaming form. Then the group of voice packets is transmitted to a streaming server via a mobile communication network. The group of voice packets is further transferred from the streaming server to the remote device in a streaming form.

10 Claims, 8 Drawing Sheets

(56) References Cited

U.S. PATENT DOCUMENTS

| | | | |
|---|---|---|---|
| 2011/0026477 A1* | 2/2011 | Sinivaara | H04L 45/308 |
| | | | 370/329 |
| 2016/0100295 A1* | 4/2016 | Pinard | G06Q 10/06 |
| | | | 455/518 |
| 2016/0165536 A1* | 6/2016 | Murali | H04W 76/28 |
| | | | 370/311 |
| 2017/0188168 A1* | 6/2017 | Lyren | G10L 19/167 |
| 2020/0213818 A1 | 7/2020 | Wilson et al. | |
| 2020/0244362 A1* | 7/2020 | Ashrafi | H04J 14/00 |

* cited by examiner

VOICE SIGNAL RELAY AND TRANSFER METHOD AND RADIO NETWORK GATEWAY

FIELD OF THE INVENTION

The present invention relates to a voice signal relay and transfer method, and more particularly to a voice signal relay and transfer method for use with an emergency announcement system. The present invention also relates to a radio network gateway, adapted to be used for executing the voice signal relay and transfer method.

BACKGROUND OF THE INVENTION

The police and firefighting units frequently use radio to communicate when they are on duty. As shown in FIG. 1, which is a schematic diagram of a conventional radio communication system, a radio walkie-talkie 100 is generally used by the police or firefighters at the scene. The radio walkie-talkie 100 transmits analog voice signals to radio relay stations 102 located at high places through a first mobile radio relay device 101, and the analog voice signals are then forwarded to a remote second mobile radio relay device 103 before arriving at the command center 104. It can be seen that such a system relies on the radio relay stations 102 built on vantage points to complete the communication network connection. Unfortunately, in metropolitan areas where a lot of high-rise buildings are located, the buildings likely hinder the communication signals from reaching many places such as narrow lanes so as to form blind spots, causing radio communication to be interrupted. As a result, deployment instructions cannot be timely conveyed, and event situations cannot be timely updated. The rescue and relief work might be adversely affected.

SUMMARY OF THE INVENTION

Therefore, the present invention provides a voice signal relay and transfer method and a radio network gateway adapted to be used for executing the voice signal relay and transfer method, which work to minimize blind spots for radio communication in an emergency announcement system.

In an aspect of the present invention, a voice signal relay and transfer method for a voice call between a radio voice terminal and a remote device, comprising: receiving a radio voice signal from the radio voice terminal and converting the radio voice signal into a digital voice signal; converting the digital voice signal into a group of voice packets in a streaming form, and transmitting the group of voice packets to a streaming server via a mobile communication network; and transferring the group of voice packets from the streaming server to the remote device in a streaming form.

In another aspect of the present invention, a radio network gateway adapted to be used with a radio voice terminal and a remote device, the radio network gateway comprising: a radio receiving and processing module, receiving a radio voice signal from the radio voice terminal, and converting the radio voice signal into a digital voice signal; and a mobile communication module in communication with the radio receiving and processing module, transmitting a group of voice packets converted from the digital voice signal in a streaming form to the remote device via a mobile communication network.

A further embodiment of the present invention relates to a radio system. The radio system includes a radio system comprises a radio voice terminal; a remote device; and a radio network gateway. The radio network gateway includes: a radio receiving and processing module, receiving a radio voice signal from the radio voice terminal, and converting the radio voice signal into a digital voice signal; and a mobile communication module in communication with the radio receiving and processing module, transmitting a group of voice packets converted from the digital voice signal in a streaming form to the remote device via a mobile communication network.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

Figure 1:
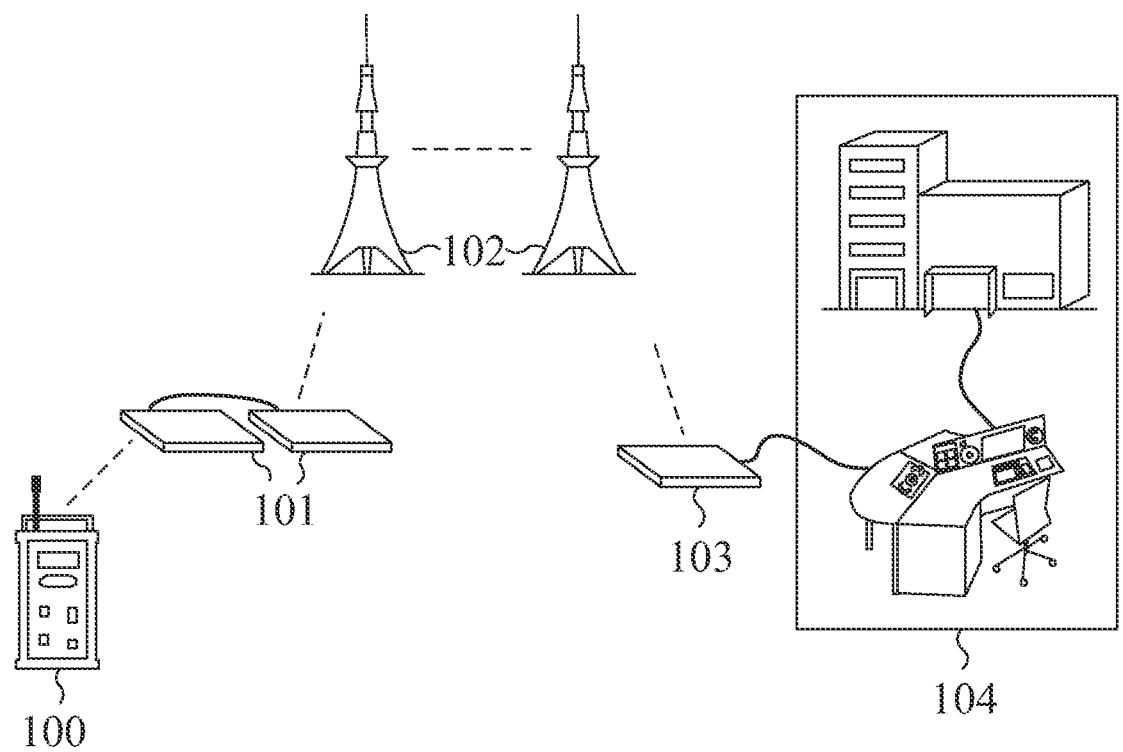
FIG. 1 is a scheme illustrating a conventional radio system for use with an emergency announcement system.

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

An embodiment of radio system according to the present invention is illustrated hereinafter with reference to FIG. 2. A walkie-talkie 200 used by on-site personnel such as police and firefighters can transmit radio voice signals through at least two kinds of channels, one of which is a conventional analog communication channel for radio voice signal transmission. A first mobile radio relay device 201 transmits a radio voice signal to one or more radio relay stations 202 located at high places, and the radio voice signal is then forwarded to a second mobile radio relay device 203 in a remote place. Subsequently, the radio voice signal would reach the command center 204. Once the radio voice signal transmission through the above-described channel is interrupted due to a blind spot, another channel can be used for radio voice signal transmission according to the present invention.

Through the alternative kind of channel, the radio voice signal transmission can be conducted as follows. A first frequency-pairing radio transceiver 210 receives the radio voice signal from the walkie-talkie 200, and transfers it to a first radio network gateway 211 to convert the radio voice signal into a digital voice signal. Subsequently, the digital voice signal is transmitted to a first mobile communication base station 212 and then optionally to other mobile communication base stations 214 and 215 through a relay server 213. The mobile phone 218 and a second radio network gateway 216 can thus receive the digital voice signal, and the second radio network gateway 216 converts the received digital voice signal back into a radio voice signal through a second frequency-pairing radio transceiver 217. The radio voice signal is then transmitted to a second mobile radio relay device 203, and finally transmitted to the command center 204. Of course, the digital voice signal transmitted from the first radio network gateway 211 may further be transmitted to a third radio network gateway 205 through the first mobile communication base station 212, and through the third radio network gateway 205, the received digital voice signal is transmitted via a third frequency-pairing radio transceiver 206 to the one or more radio relay stations 202 located high to detour from blind spots.

Figure 2A:
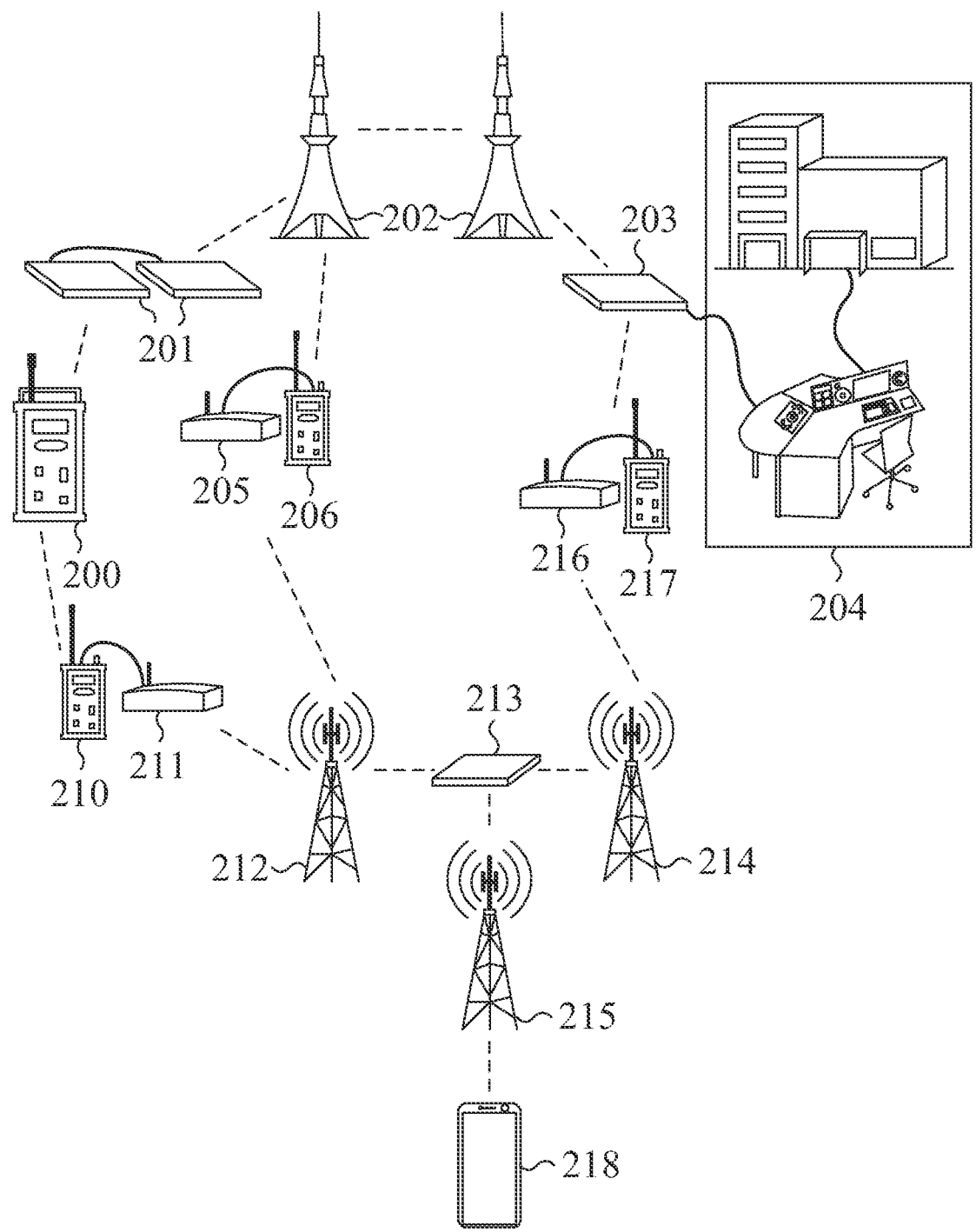
FIG. 2A is a scheme illustrating a radio system adapted to be used with an emergency announcement system according to an embodiment of the present invention.
Figure 2B:
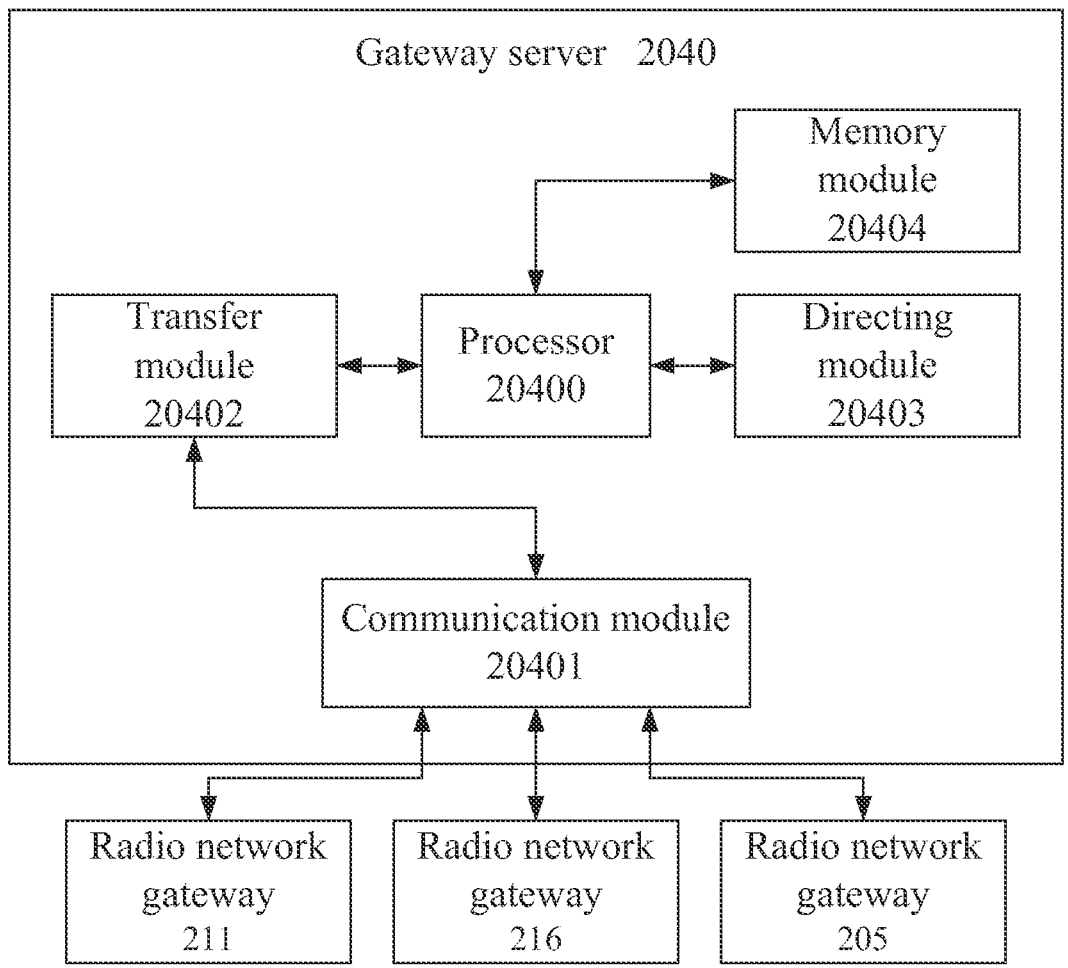
FIG. 2B is a functional block diagram schematically illustrating an embodiment of a gateway server used in the command center of FIG. 2A according to the present invention.

The command center 204 described above includes a gateway server 2040, as illustrated in FIG. 2B. The gateway server 2040 includes a processor 20400, a communication module 20401, a transfer module 20402, a directing module 20403 and a memory module 20404, and is in communication with the first radio network gateway 211, the second radio network gateway 216 and the third radio network gateway 205. The communication module 20401 is communicable with the second mobile radio relay device 203 in a wireless manner, e.g. via 4G/5G mobile communication, while being in communication with the server host via a wired or fixed network. The transfer module 20402 checks information of gateways receiving from the directing module 20403 and performs transference of digital voice signals, including receiving and transmitting operations, based on the received information. The processor 20400 functions for processing the information data, checking and transferring commands for intelligent gateway identification, and allocating transmission of digital voice signals that have not been played yet. As for the directing module 20403, it records therein a gateway list and identification codes (ID) of gateways, checks requests for registering gateways, and compares and records information transmitted back via double loops. The memory module 20404 stores therein an operating system and a transmission record of a host. It is commonly known that transmission of voices is likely to delay for a couple of seconds or more due to mobile network delay and/or unavoidable processing time of transferring and decoding packets. Particularly when a large number of users are transferring messages in a confined area at the same time, e.g. in a big event venue, the total delay time of the voice transmission would be longer, and thus quite unfavorable for the sending and receiving of disaster relief instructions and emergency information in the police and fire fighting systems.

Figure 3:
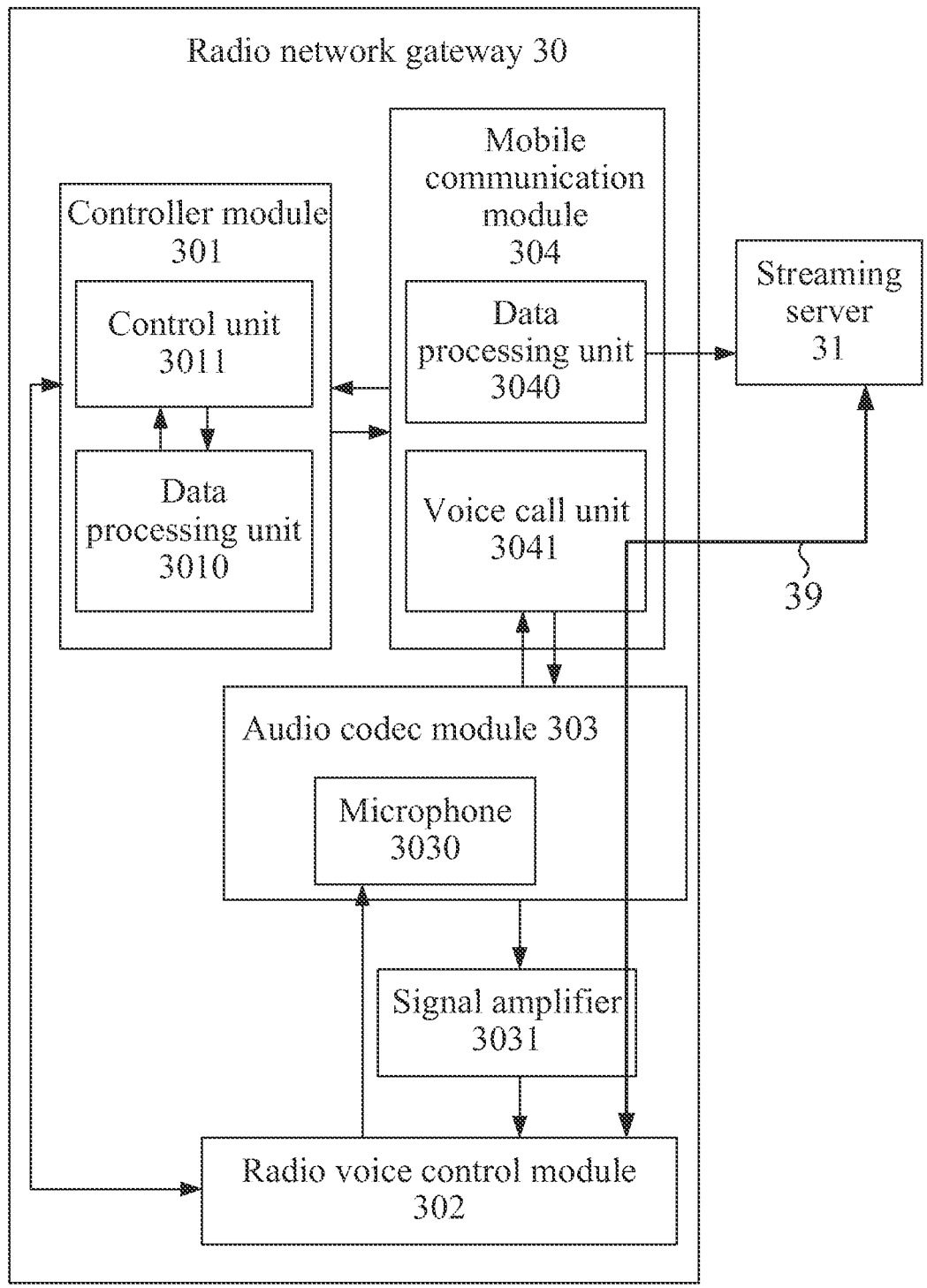
FIG. 3 is a functional block diagram schematically illustrating an embodiment of radio network gateway used in the radio system of FIG. 2A according to the present invention.

Please further refer to FIG. 3, in which a radio network gateway adapted to be used as the first radio network gateway 211, the second radio network gateway 216 or the third radio network gateway 205 is shown. The radio network gateway 30 illustrated in FIG. 3 includes a controller module 301, a radio voice control module 302, an audio codec module 303 and a mobile communication module 304. The controller module 301 includes a data processing unit 3010 and a control unit 3011. The data processing unit 3010 functions for compressing and decompressing audio signals, e.g. converting a WAV (Waveform Audio) file in an uncompressed audio format into an AAC (Advanced Audio Coding) file in a lossy compressed audio format, or vice versa. In this embodiment, the radio voice control module 302 and audio codec module 303 are combined to form a radio receiving and processing module, wherein the radio voice control module 302 receives and demodulates a remote radio voice signal into an audio wave to be played. After being converted by a microphone 3030 into an analog signal, the analog signal is further processed by the audio codec module 303, and thus a digital modulated voice signal is generated, for example, by way of pulse-code modulation (PCM). Subsequently, as indicated by the arrow 39, the digital modulated voice signal is inputted to the mobile communication module 304 by the radio voice control module 302 to activate a Voice over Long Term Evolution (VoLTE) voice call. The mobile communication module 304 further includes a data processing unit 3040 and a voice communication unit 3041. Taking 4G mobile communication as an example, the data processing unit 3040 may be an LTE mobile data processing unit, and the voice communication unit 3041 may be a VoLTE call unit. Furthermore, after the voice signal sent from the voice communication unit 3041 is restored into voice by the audio codec module 303, the voice is sent for the radio voice call via the radio voice control module 302. In FIG. 3, a streamlining server 31 is illustrated to communicate with the radio network gateway 30 and function as a relay server.

In order to reduce the delay time, the above-described digital modulated voice signal is directly transmitted to the streaming server 31 via the voice communication unit 3041 of the mobile communication network 304 without being compressed by the data processing unit 3010 of the controller module 301. For achieving this purpose, it is preferable that a series of digital modulated voice signals could operate under the same transmission protocol for communication. The transmission protocol, for example, may be Session Initiation Protocol (SIP) or an IP-based voice transmission protocol, e.g. Voice over Internet Protocol (VoIP), which can be used to establish, modify, and terminate interactive user conversations including a variety of multimedia elements such as video, voice, and instant messaging.

Figure 4:
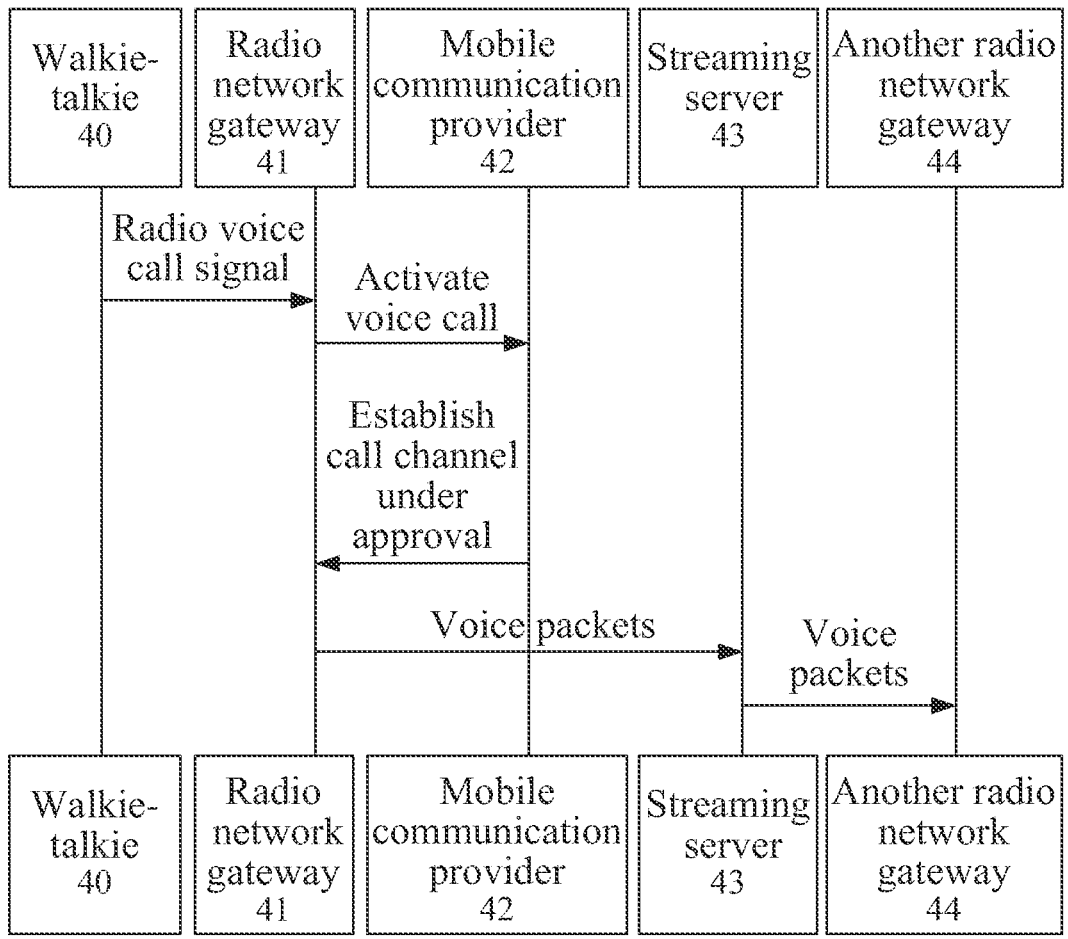
FIG. 4 is a scheme illustrating a process of establishing a call channel in a voice signal relay and transfer method according to an embodiment of the present invention.

Please refer to the flowchart of FIG. 4, in which a process of establishing a call channel in a voice signal relay and transfer method according to an embodiment of the present invention is illustrated. When a radio walkie-talkie 40 issues a radio voice signal, the radio voice signal is converted into a digital modulated voice signal by a radio network gateway 41. Then a mobile communication voice call, e.g. VoLTE call, is activated and a call channel is established under approval of a mobile communication provider 42. The way to establish a call channel for the mobile communication voice call resembles that for a common mobile phone call. Then the radio network gateway 41 transmits a set of voice packets in a form of streaming to a streaming server 43 under Session Initiation Protocol (SIP) or an IP-based voice transmission protocol such as Voice over Internet Protocol (VoIP), and then the streaming server 43 forwards the set of voice packets in the streaming form to a remote device through the established call channel. The remote device may be another radio network gateway 44. It is to be noted that in this embodiment, the voice packets of the digital voltage signal in the streaming form are directly transmitted to the streaming server via a mobile communication network to be further transferred. Therefore, the time spent for compression can be eliminated. Furthermore, in principle, the voice packets in the streaming form are transferred in real time, so unnecessary signal delay can be exempted from.

Figure 5:
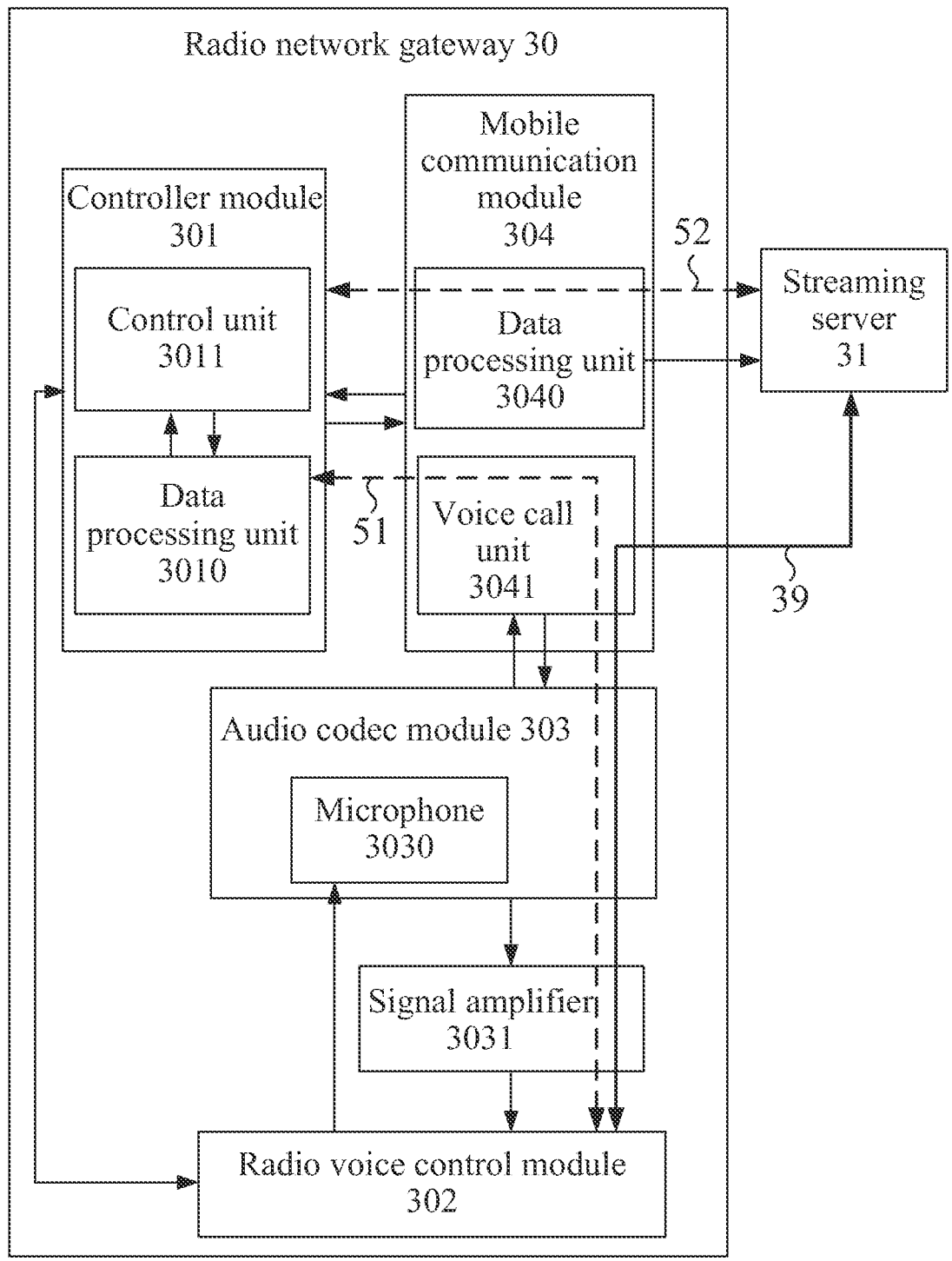
FIG. 5 is a functional block diagram schematically illustrating another embodiment of radio network gateway used in the radio system of FIG. 2A according to the present invention.

Please refer to FIG. 5, which schematically illustrates another embodiment of radio network gateway used in the radio system of FIG. 2A according to the present invention. The hardware architecture of the embodiment of radio network gateway illustrated in FIG. 5 is similar to that of the embodiment illustrated in FIG. 3 except signal paths shown with dash lines. The signal path shown in FIG. 5 indicates a path of a digital modulated voice signal generated by the audio codec module 303 and transmitted to the data processing unit 3010 of the controller module 301. The data processing unit 3010 compresses the digital modulated voice signal so as to convert the digital modulated voice signal into an audio file in a compressed format. The compressed digital modulated voice signal is then transmitted to the control unit 3011 for voice recognition, content interpretation, and audio file saving. The generated information, e.g. saved audio file segments, voice recognition results, content interpretation results, sensor data and/or global positioning information, can be obtained through the signal path 52 established by the data processing unit 3040 in the mobile communication module 304, further transmitted to the streaming server 31, and then transmitted back to the remote command center 204. In this way, in addition to reduced signal delay as illustrated with reference to FIG. 4, additional functions can also be provided with an additional signal processing loop. For example, time-spending processes including voice recognition, voice content interpretation, message transmission and reconfirmation and audio file saving can be performed through the additional signal processing loop. It is to be noted that the control unit 3011 may conduct machine learning while performing voice recognition and content interpretation, and a command order is possibly changed and provided for the command center to do final check as a result of the recognition.

A process of controlling voice communication in a voice signal relay and transfer method according to an embodiment of the present invention and a radio network gateway used for executing the method will be described hereinafter. Since a radio call has a feature of Push to Talk (PTT), a right to use a specified channel to talk cannot be obtained until the channel is released upon ending previous talk. The rule also applies to a radio call accessing the radio channel from a mobile communication system. On the other hand, there is likely a breakpoint during a continuous talk, and the system might improperly determine that the communication terminates and releases the right to call at that time. The problem can be ameliorated by the present invention.

Figure 6A:
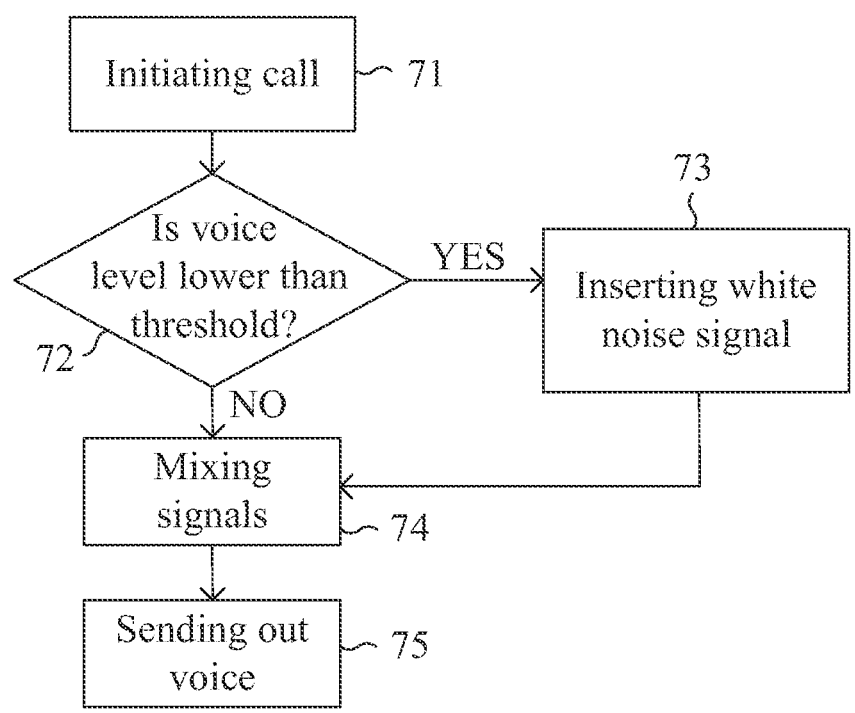
FIG. 6A is a flowchart illustrating a process of controlling voice communication in a voice signal relay and transfer method according to an embodiment of the present invention.
Figure 6B:
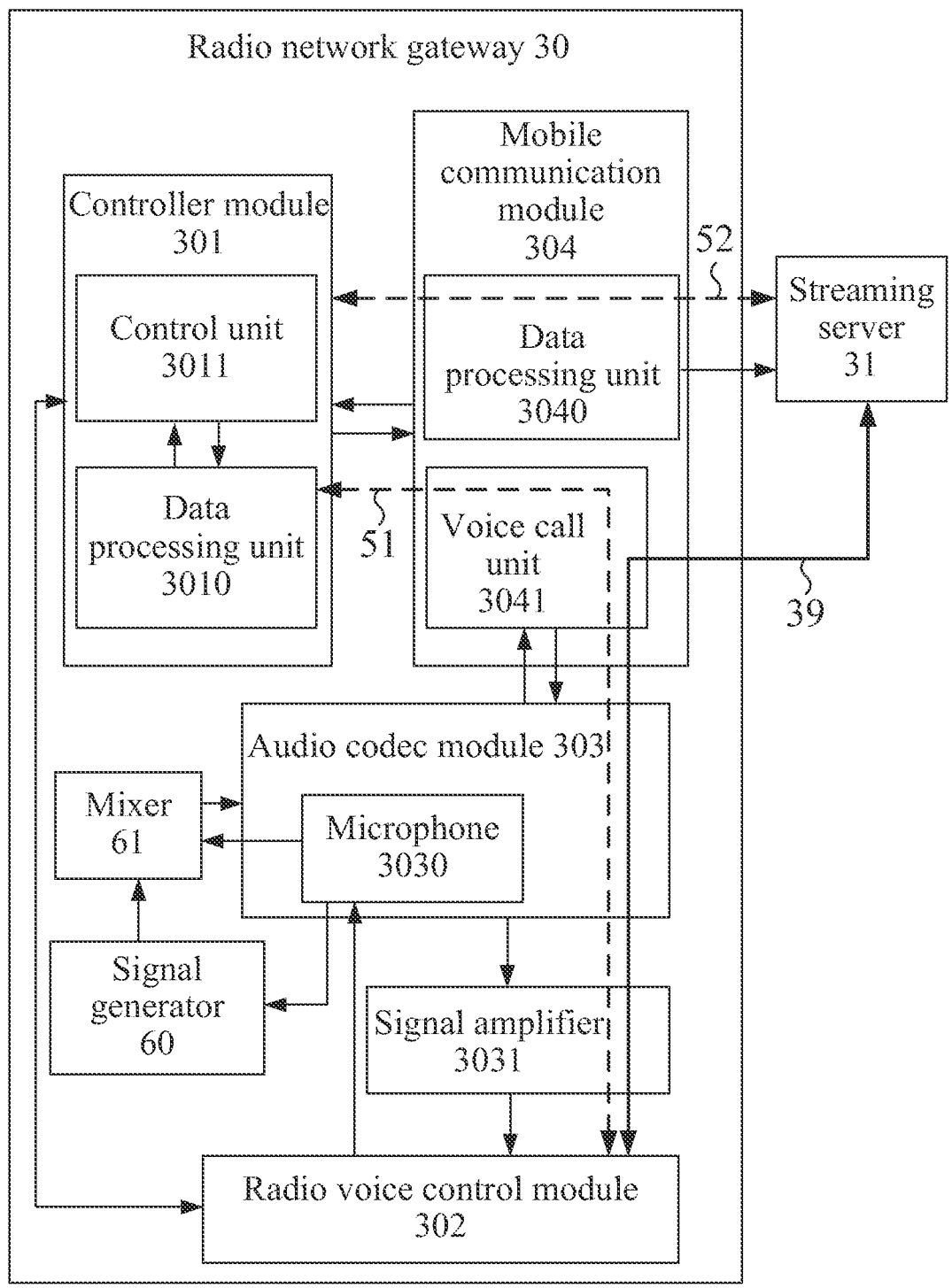
FIG. 6B is a functional block diagram schematically illustrating a further embodiment of radio network gateway according to the present invention, which is used for executing the method of FIG. 6A.

Please refer to FIG. 6A and FIG. 6B. When the user presses a call button to initiate a call (Step 71), the microphone 3030 continuously and dynamically detects a voice level of the call (Step 72). If the voice level is in a normal range, it is determined that a common call is on progress. On the contrary, if the voice level is lower than a preset threshold, a signal generator 60 is activated to generate a specific signal, e.g. a white noise signal (Step 73), which is transmitted to a mixer 61 to be mixed with a voice signal originated from the microphone 3030 (Step 74). The voice signal mixed with the white noise signal is then transmitted to the audio codec module 303 to be processed and then sent out from the voice call unit 3041 in the mobile communication module 304 (Step 75). It is understood that the voice level can be promoted by mixing with the white noise signal without being prominently noticed by human ears. Therefore, the problem in improperly losing right to talk due to a breakpoint in the continuous voice call can be avoided by inserting a redundant signal to the voice signal to cover the breakpoint.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A radio network gateway adapted to be used with a radio voice terminal and a remote device, the radio network gateway comprising:
   a radio receiving and processing module, receiving a radio voice signal from the radio voice terminal, and converting the radio voice signal into a digital voice signal;
   a mobile communication module in communication with the radio receiving and processing module, transmitting a group of voice packets converted from the digital voice signal in a streaming form to the remote device via a mobile communication network;
   a signal generator, generating a white noise signal if a voice level of the radio voice signal is lower than a preset threshold; and
   a mixer, mixing the radio voice signal with the white noise signal for promoting the voice level before converting the radio voice signal into the digital voice signal.

2. The radio network gateway according to claim 1, wherein the radio receiving and processing module includes:
   a radio voice control module, receiving and demodulating the radio voice signal into an audio wave, which is further converted into an analog signal by a microphone; and
   an audio codec module, processing the analog signal converted from the audio wave into the digital voice signal, and transmitting the digital voice signal directly to the mobile communication module.

3. The radio network gateway according to claim 1, wherein the mobile communication network includes a voice call unit, which sends out the group of voice packets in a streamlining form via the mobile communication network.

4. The radio network gateway according to claim 1, further comprising a controller module, compressing and converting the digital voice signal into an audio file, performing a process of voice recognition, content interpretation and saving of the audio file to obtain additional information, and transmitting the additional information to the remote device via a streaming server.

5. A radio system, comprising:
   a radio voice terminal;
   a remote device; and
   a radio network gateway, comprising:
      a radio receiving and processing module, receiving a radio voice signal from the radio voice terminal, and converting the radio voice signal into a digital voice signal;
      a mobile communication module in communication with the radio receiving and processing module, transmitting a group of voice packets converted from the digital voice signal in a streaming form to the remote device via a mobile communication network;

a signal generator, generating a white noise signal if a voice level of the radio voice signal is lower than a preset threshold; and a mixer, mixing the radio voice signal with the white noise signal for promoting the voice level before converting the radio voice signal into the digital voice signal.

6. The radio system according to claim 5, further comprising a microphone, wherein the radio receiving and processing module includes:

a radio voice control module, receiving and demodulating the radio voice signal into an audio wave to be played; and an audio codec module, and wherein the radio voice signal is converted into the digital voice signal by the microphone and the audio codec module, and transmitted directly to the mobile communication module.

7. The radio system according to claim 5, wherein the mobile communication network includes a voice call unit, which sends out the group of voice packets in a streamlining form via the mobile communication network.

8. The radio system according to claim 5, further comprising a streaming server, wherein the group of voice packets are transferred to the remote device by the streaming server.

9. The radio system according to claim 8, further comprising a controller module, compressing and converting the digital voice signal into an audio file, performing a process of voice recognition, content interpretation and saving of the audio file to obtain additional information, and transmitting the additional information to the remote device via the streaming server.

10. The radio system according to claim 9, wherein the remote device is a command center comprising a gateway server, and the gateway server comprises a directing module, which records therein a gateway list and identification codes (ID) of gateways, checks requests for registering gateways, and compares and records returned information via double loops.

\* \* \* \* \*